US011775438B2

(12) United States Patent
Hua et al.

(10) Patent No.: US 11,775,438 B2
(45) Date of Patent: Oct. 3, 2023

(54) INTELLIGENT CACHE WARM-UP ON DATA PROTECTION SYSTEMS

(71) Applicant: EMC IP Holding Company LLC, Hopkinton, MA (US)

(72) Inventors: Shuai Hua, Hopkinton, MA (US); Yong Zou, Hopkinton, MA (US); Wenhao Hu, Hopkinton, MA (US); Rahul Ugale, Hopkinton, MA (US)

(73) Assignee: EMC IP Holding Company LLC

(*) Notice: Subject to any disclaimer, the term of this patent is extended or adjusted under 35 U.S.C. 154(b) by 179 days.

(21) Appl. No.: 16/988,282

(22) Filed: Aug. 7, 2020

(65) Prior Publication Data

US 2022/0043752 A1 Feb. 10, 2022

(51) Int. Cl.
*G06F 12/0862* (2016.01)
*G06F 12/0891* (2016.01)
*G06N 5/04* (2023.01)
*G06N 20/00* (2019.01)

(52) U.S. Cl.
CPC ...... *G06F 12/0862* (2013.01); *G06F 12/0891* (2013.01); *G06N 5/04* (2013.01); *G06N 20/00* (2019.01); *G06F 2212/1021* (2013.01); *G06F 2212/608* (2013.01)

(58) Field of Classification Search
CPC ............ G06F 12/0862; G06F 12/0891; G06F 12/0897; G06F 2212/6024; G06N 20/00
See application file for complete search history.

(56) References Cited

U.S. PATENT DOCUMENTS

2018/0373722 A1* 12/2018 Ulasen ................. G06N 3/0445
2020/0326871 A1* 10/2020 Wu ........................ G06F 3/0647

* cited by examiner

*Primary Examiner* — Baboucarr Faal
(74) *Attorney, Agent, or Firm* — Dergosits & Noah LLP; Todd A. Noah

(57) ABSTRACT

System identifies multiple data blocks in workload stored in slow access persistent storage, data blocks copied to fast access persistent storage, and, after speed of accessing workload satisfies threshold, copied data blocks that remained in fast access persistent storage. System annotates some remaining data blocks with cache label and derives features for some data blocks in workload, based on corresponding bits set and/or time stamp. System uses cache labels and features for some data blocks in workload to train machine-learning model to predict which data blocks in workload will remain in fast access persistent storage after workload access satisfies threshold. System derives features for data block requested from production workload. System copies requested data block to production fast access persistent storage if trained machine-learning model uses features for requested data block to predict requested data block will remain in production fast access persistent storage after production workload access satisfies threshold.

20 Claims, 8 Drawing Sheets

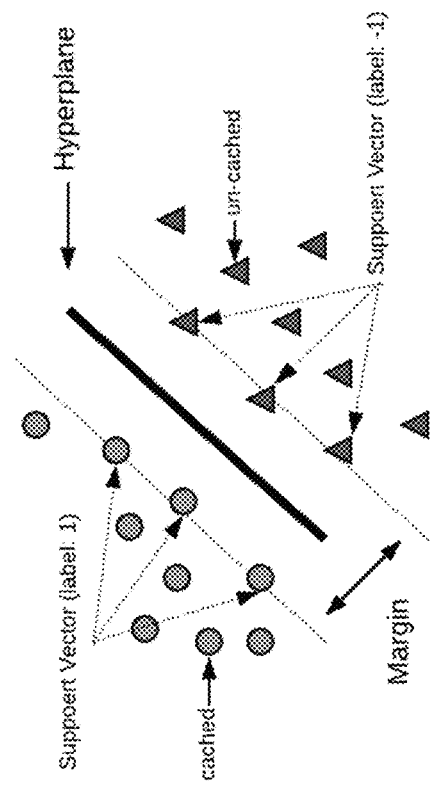
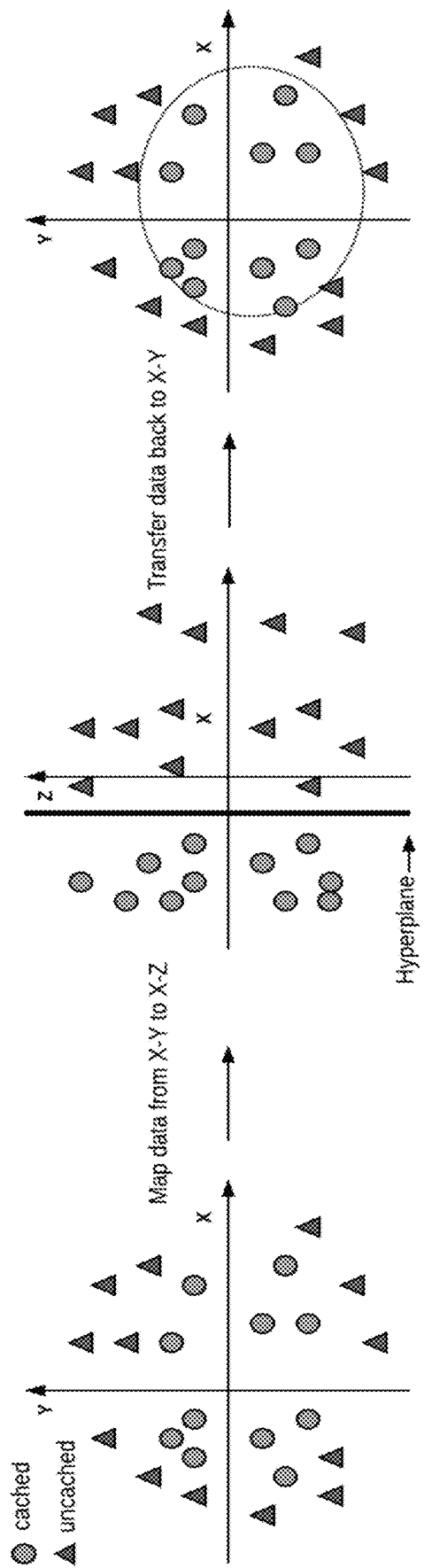
FIG. 3A
FIG. 3B
FIG. 3C
FIG. 3D

INTELLIGENT CACHE WARM-UP ON DATA PROTECTION SYSTEMS

BACKGROUND

A data object can be a set of information that is backed up as a unit. If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of data and these values' embedding in a database's data structures) within dedicated backup files. When the data protection administrator decides to return the data object to a previous state, the data protection administrator specifies the desired previous state by identifying a desired time when the data object was in this state, and then instructs the backup/restore application to execute a restore operation to restore a copy of the corresponding backup file(s) for that state to the data object.

A data object may be stored on a storage array, which can be a disk-based retention system that includes multiple disk drives. Unlike a disk enclosure, a storage array has cache memory and advanced functionality, such as virtualization and Redundant Array of Independent Disks (RAID). A data protection administrator can instruct a backup/restore application to create backups files of data objects and then store the backup files of data objects on multiple storage arrays.

If one type of storage device, such as a solid-state drive, has faster data access (read/write performance) than another type of storage device, such as a traditional hard disk drive, a data protection system can reduce data access time and thereby increase execution speed by using one or more of the faster access storage devices to store data which is more frequently accessed than the infrequently accessed data which is stored in the slower storage device(s). Therefore, a solid-state drive can serve as an alternative cache medium between a data protection system's storage levels, such as between RAM (random-access memory) and hard disk drives. FIG. 1 illustrates a block diagram of an example multi-level cache architecture in a data protection system 100 which includes four storage levels and four different types of storage devices. However, the multi-level cache architecture in the data protection system 100 can include any number of storage levels, any different types of storage devices, and any number of each different type of storage device.

The data which is extremely frequently accessed, which may be referred to as the hottest data, is located at level one storage 102, or CPU (Central Processing Unit) cache 102, and the data which is very frequently accessed, which may be referred to as very hot data, is located at level two storage 104, or RAM (random-access memory) 104. The data which is frequently accessed, which may be referred to as hot data, is located at level three storage 106, or SSD (solid-state drive) 106, and the data which is infrequently accessed, which may be referred to as cold data, is located at level four storage 108, or HDD/(hard disk drive) 108. The data protection system 100 processes a data request by sequentially determining if the data is in the CPU cache 102, the RAM 104, the solid-state drive 106, and the hard disk drive 108 until the data protection system 100 is able to retrieve the data. The data accessing speed is faster the closer that the retrieved data is stored to CPU cache 102 and is slower the closer that the retrieved data is stored to the hard disk drive 108.

A lower level storage device, such as the solid state-drive 106, may have a significant amount more storage capacity than higher level storage device, such as the CPU cache 102 and the RAM 104, and may also has a faster throughput than the lowest level storage device, such as the hard disk drive 108. However, the data protection system 100 does not typically use the solid-state drive 106 to store all the data that could have been stored in the hard disk drive 108 because using the solid-state drive 106 usually has a much higher cost than using the hard disk drive 108. Furthermore, since an increase in the amount of write operations will diminish the lifetime of the solid-state drive 106, the data protection system 100 can extend the lifetime of the solid-state drive 106 by not caching infrequently accessed data to the solid-state drive 106, which provides more capacity on the solid-state drive 106 to store frequently accessed data. Therefore, the solid-state drive 106 is mainly used to increase the speed of retrieving data by storing frequently accessed data while the hard disk drive 108 are used for permanent storage of infrequently accessed data.

FIG. 1 illustrates the following typical data access patterns. Data access pattern 0 occurs when the requested data is in the CPU cache 102, and the data protection system 100 accesses the data in the CPU cache 102. Data access pattern 1→6 occurs when the requested data is stored in the RAM 104, and the data protection system 100 determines that the CPU cache 102 does not store the requested data, uses the data request 1 to request the data from the RAM 104, and uses the data response 6 to return the requested data from the RAM 104 to the CPU cache 102. Data access pattern 1→2→5→6 occurs when the requested data is in the solid-state drive 106, and the data protection system 100 determines that the CPU cache 102 does not store the requested data, uses the data request 1 to determine that the RAM 104 does not store the requested data, uses the data request 2 to request the data from the solid-state drive 106, uses the data response 5 to return the requested data from the solid-state drive 106 to the RAM 104, and uses the data response 6 to return the requested data from the RAM 104 to the CPU cache 102. Data access pattern 1→2→3→4→5→6 occurs when the requested data is in the hard disk drive 108, and the data protection system 100 determines that the CPU cache 102 does not store the requested data, uses the data request 1 to determine that the RAM 104 does not store the requested data, uses the data request 2 to determine that the solid-state drive 106 does not store the requested data, and uses the data request 3 to request the data from the hard disk drive 108. Then the data protection system 100 uses the data response 4 to return the requested data from the hard disk drive 108 to the solid-state drive 106, uses the data response 5 to return the requested data from the solid-state drive 106 to the RAM 104, and uses the data response 6 to return the requested data from the RAM 104 to the CPU cache 102.

When the data protection system 100 uses the data access pattern 1→2→3→4→5→6, the data protection system 100 typically caches the requested data retrieved from the hard disk drive 108 in the solid-state drive 106 based on the assumption that this requested data will be accessed again later. Since data access patterns are unpredictable, the assumption that all of the requested data which is retrieved from the hard disk drive 108 will need to be cached in the solid-state drive 106 for future access may be an invalid assumption. It is highly possible that some of the requested data which is cached to the solid-state drive 106 will be infrequently or never requested again. However, when following any traditional caching policy, this requested data will still be cached in the solid-state drive 106 until this requested data is finally evicted by a cache eviction algorithm. Data swapped in and out of the solid-state drive 106 in this situation is unnecessary data churn, which wastes the capacity, lowers the efficiency, and reduces the lifetime of the solid-state drive 106.

BRIEF DESCRIPTION OF THE DRAWINGS

FIG. 3A-D illustrate block diagrams of example hyperplanes splitting cached and un-cached data for intelligent cache warm-up on data protection systems, under an embodiment;

DETAILED DESCRIPTION

Figure 1:
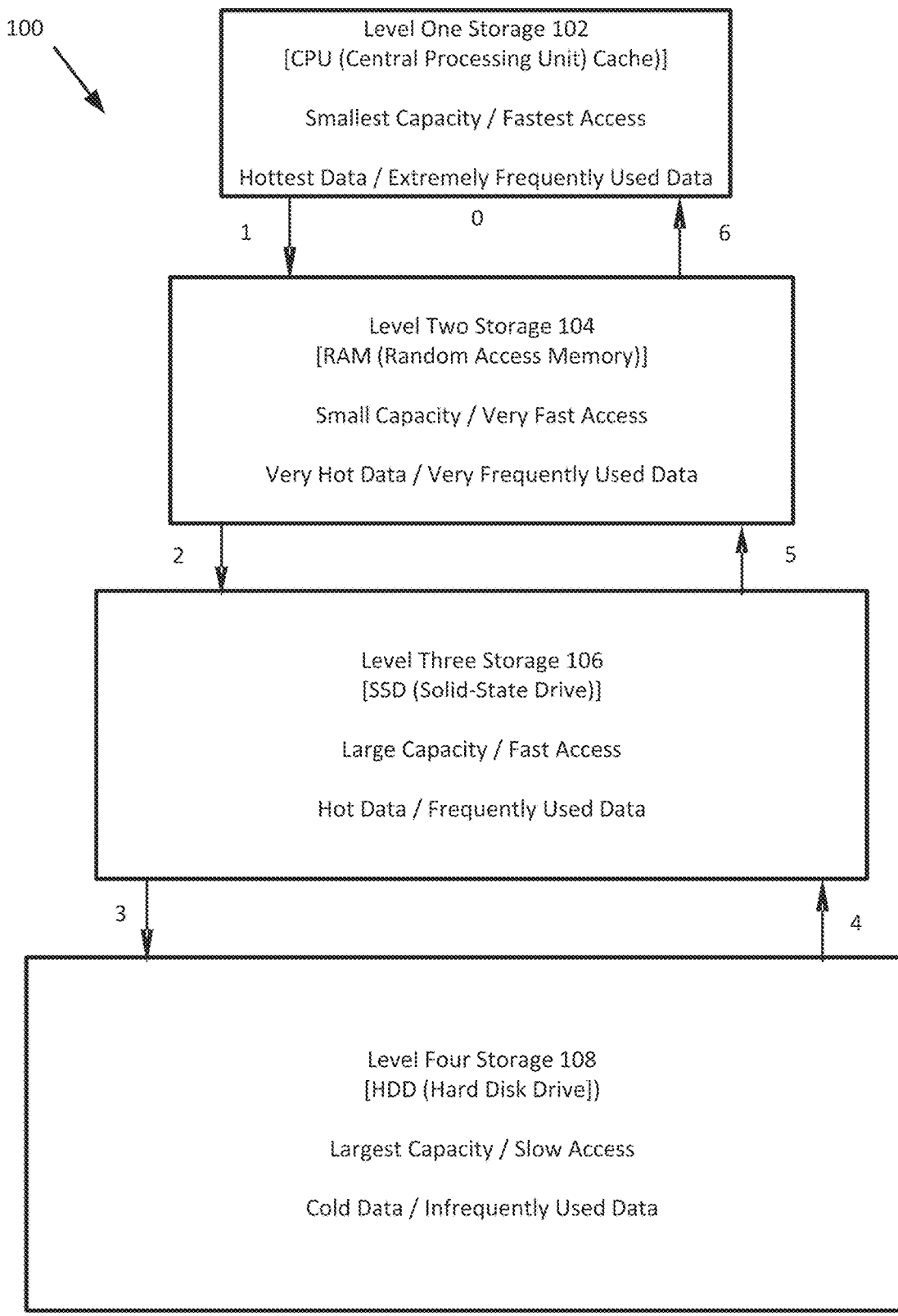
FIG. 1 illustrates a block diagram of an example multi-level cache architecture of a data protection system.

The challenge in generating the optimal caching policy for the solid-state drive 106 is to identify which requested data that is stored in the hard disk drive 108 will probably be frequently accessed data, and which requested data will probably be infrequently accessed data. Any requested data that will probably be frequently accessed should be initially cached to the solid-state drive 106 for faster access and to avoid slowing execution of the data protection system 100 via accessing the hard disk drive 108, while any requested data that will probably be infrequently accessed should not be cached to and occupy space in the solid-state drive 106, which should be used for storing frequently accessed data instead.

A typical working set of applications or virtual machines may require 20-30% of a solid-state drive's total storage capacity. However, identifying this working set in advance may be a significant challenge. Since around 70-80% of a solid-state drive's capacity may be available for caching frequently accessed data, a typical data protection system attempts to speed up cache warm-up and uses a cache eviction algorithm to effectively cache frequently accessed data in the solid-state drive. An application or a virtual machine does not achieve desired performance during the cache warm-up period when the initial cache hits in the solid-state drive are significantly low, and finally achieves desired performance after the solid-state drive's cache is warmed up by progressively increasing the amount of frequently accessed data that is cached and reducing the amount of infrequently accessed data that is cached. A typical data protection system attempts to speed up cache warm-up by using a traditional technology called cache read-ahead, which has no information about what stored data will actually become frequently accessed data. When the typical data protection system uses an I/O (Input/Output) request to retrieve data from an address in a hard disk drive and then caches this data as frequently accessed data in a solid-state drive, the cache read-ahead technology assumes that the unrequested data which sequentially follows the requested data in the hard disk drive has a higher than average probability of also becoming frequently accessed data, and therefore prefetches a certain size of the unrequested data right after the address in the hard disk drive where the I/O (Input/Output) request retrieved the requested data. Although the cache read-ahead technology has an advantage by boosting a data protection system's performance, it has a disadvantage because the solid-state drive not only caches the requested data, but also caches significant portions of unrequested data that will subsequently be identified as infrequently accessed data by a cache eviction algorithm that eventually evicts the unrequested data. Additionally, the cache eviction algorithm evicting the unrequested data results in data churn, which reduces the lifetime of solid-state drives.

A typical data protection system can use intermediate level storage, such as a solid-state drive, to cache customized workloads that are executing without copying out the backup binaries to other machines or storage devices. For example, a data protection system has 10,000 virtual machines on its deduplication backup storage and a customer powers on these virtual machines and runs them directly on the data protection system. However, in this scenario only 60 virtual machines can run simultaneously in the high-end data protection system with a 1.25 pb (petabytes) backup capacity because caching is limited by a solid-state drive's capacity, which is also used to cache metadata. If the customer uses some virtual machines for the purposes of verification, development, and testing, a typical cache warm up does not fit this use case on a data protection system with a large amount of virtual machines stored in a backup file system. If the customer powers on and runs virtual machines for a certain time for verification purposes, and then shuts down those virtual machines, a typical cache eviction algorithm may not function effectively. These problems limit the workloads of virtual machines and usage of solid-state drives as cache. Although these examples describe workloads of virtual machines, any types workloads could be used, such as an application.

Embodiments herein provide intelligent cache warm-up on data protection systems. A system identifies multiple data blocks in a workload stored in a slow access persistent storage, some of the data blocks copied to a fast access persistent storage, and, after a speed of accessing the workload satisfies a threshold, some of the copied data blocks that remained in the fast access persistent storage. The system annotates some of the remaining data blocks with a cache label and can annotate some of the other data blocks in the workload with an un-cached label. The system derives features for some of the data blocks in the workload based on corresponding bits set and/or a corresponding time stamp. The system uses the cache labels and the features for some of the data blocks in the workload to train a machine-learning model to predict which data blocks in the workload will remain in the fast access persistent storage after the speed of accessing the workload satisfies the threshold. The system derives the features for a data block requested from a production workload. The system copies the requested data block to a production fast access persistent storage only if the trained machine-learning model uses the features for the requested data block to predict that the requested data block will remain in the production fast access persistent storage after the speed of accessing the production workload satisfies the threshold. Then the system can copy the requested data block to a production fast access volatile storage.

For example, a log device logs the addresses of some of more than a million 8 kb data blocks in a 100 gb virtual machine, which is stored in hard drives, the addresses of some data blocks that were cached in a solid-state drive, the addresses of some data blocks that a cache eviction algorithm evicted from the solid-state drive, and the addresses of some data blocks that remain cached in the solid-state drive when cache warm-up is achieved. The log device annotates some data blocks that remain cached in the solid-state drive with the value "+1," which represents cached, and can annotate some data blocks that were evicted from being cached in the solid-state drive or never cached in the solid-state drive with the value "−1," which represents un-cached. A dataset generator initially selects the first 2 bytes from some data blocks, learns that too many data blocks have the same values for the first 2 bytes, and then selects the first 3 bytes from some data blocks. A training machine-learning data classifier model uses the cache and un-cached labels and the features for some data block in the 100 gb training virtual machine to predict which data blocks will remain cached in the solid-state drive. A production server responds to a request to retrieve a data block from a 100 gb virtual machine stored in hard disk drives by deriving features to differentiate between the requested data block and some of the more than one million other data blocks in the 100 gb virtual machine. The production server caches the requested data block into the solid-state drive only if the production machine-learning data classifier model predicts that the requested data block will remain cached in the solid-state drive. The production server can also store the requested data block into the production RAM. Since the data blocks that are requested and predicted to remain in cache are the only data blocks that are actually cached, the production server reduces the probabilities of caching requested data that will be infrequently accessed and eliminates the caching of unrequested data that just happens to be near requested data, thereby speeding up cache warm-up, optimizing the efficiency of cache storage space, and extending the lifetime of the cache device.

Figure 2A:
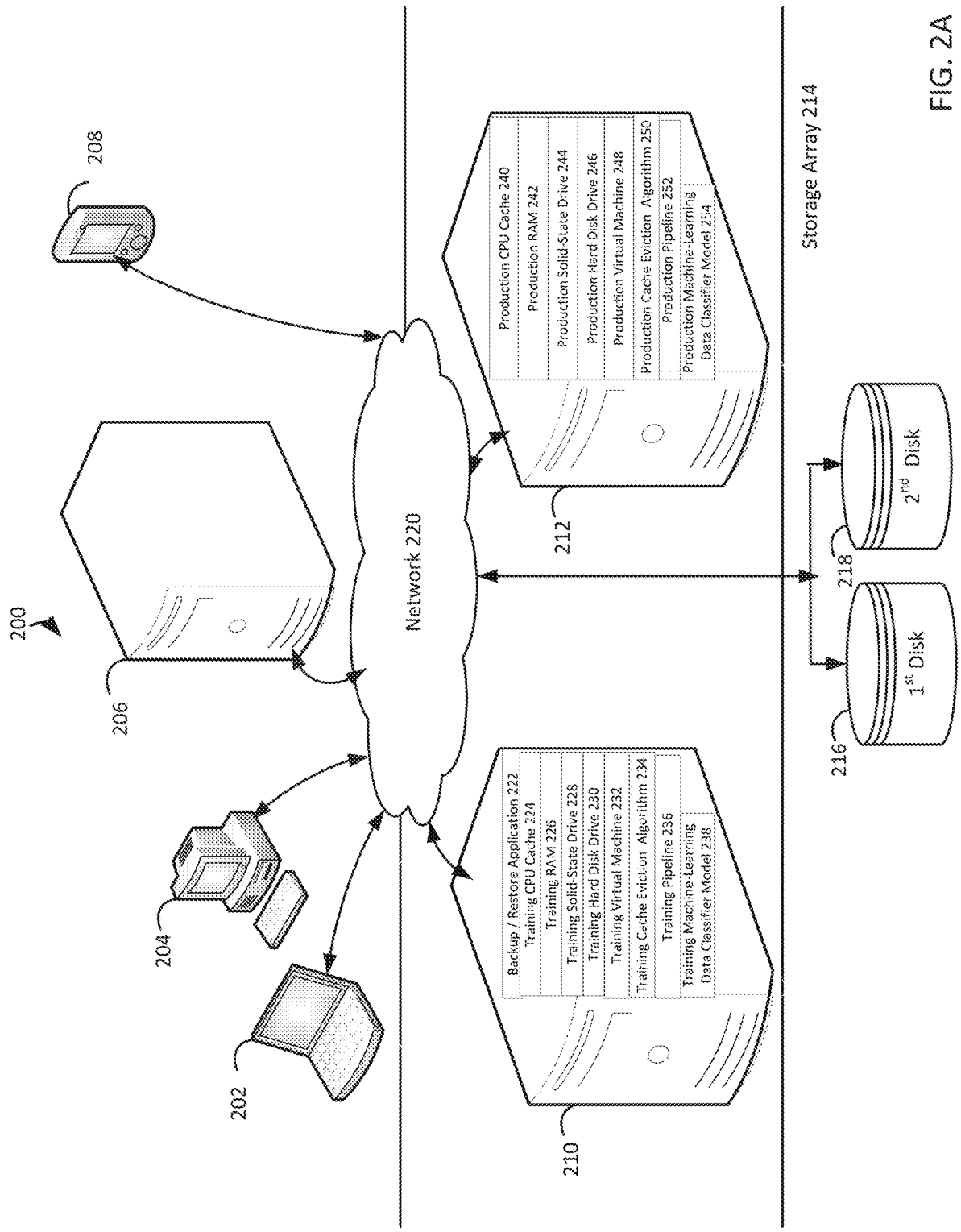
FIG. 2A illustrates a block diagram of an example system for intelligent cache warm-up on data protection systems, under an embodiment.

FIG. 2A illustrates a diagram of a system 200 for intelligent cache warm-up on data protection systems, under an embodiment. As shown in FIG. 2A, the system 200 may illustrate a cloud computing environment in which data, applications, services, and other application resources are stored and delivered through shared data centers and appear as a single point of access for the users. The system 200 may also represent any other type of distributed computer network environment in which servers control the storage and distribution of application resources and services for different client users.

In an embodiment, the system 200 represents a cloud computing system that includes a first client 202, a second client 204, a third client 206, and a fourth client 208; and a first server 210, a second server 212, and a storage array 214 that may be provided by a hosting company. Although FIG. 2A depicts the first client 202 as a laptop computer 202, the second client 204 as a personal computer 204, the third client 206 as a server 206, and the fourth client 208 as a smartphone 208, each of the clients 202-208 may be any type of computer. The storage array 214 includes a first disk 216 and a second disk 218. The clients 202-208, the servers 210-212, and the storage array 214 communicate via a network 220. Although FIG. 2A depicts the system 200 with four clients 202-208, two servers 210-212, one storage array 214, two disks 216-218, and one network 220, the system 200 may include any number of clients 202-208, any number of servers 210-212, any number of storage arrays 214, any number of disks 216-218, and any number of networks 220. The clients 202-208 and the servers 210-212 may each be substantially similar to the system 500 depicted in FIG. 5 and described below.

The server 210, which may be referred to as a backup server 210, includes a backup/restore application 222 that can create backup files of data objects for the clients 202-208, and execute a restore based on the backup files stored on the storage array 212. The backup/restore application 222 can provide centralized administration, such as scheduling, monitoring, and managing backup operations and backup files. The backup/restore application 222 can enable the storing of backup operation schedules, client policies, and client configurations. The backup/restore application 222 can provide a unique interface to the clients 202-208 during login, and also assist the backup server 210 in authenticating and registering the clients 202-208. The backup/restore application 222 can send backup/restore work orders to the clients 202-208, which can receive and process the work orders to start a backup or restore operation. The backup/restore application 222 can maintain a local database of all processes that execute on the backup server 210. The backup/restore application 222 can execute server-side processes for a system administrator's graphical management console, which may enable the system administrator to use command line interface tools for queries. For example, a system administrator identifies the clients 202-208 registered with the backup server 210.

The first server 210 may also be referred to as a training server 210, and may include a training CPU cache 224, a training RAM 226, a training solid-state drive 228, training hard disk drives 230, a training virtual machine 232, a training cache eviction algorithm 234, a training pipeline 236, and a training machine-learning data classifier model 238. Although FIG. 2A depicts the backup/restore application 222 and the training server components 224-238 residing completely on the first server 210, the backup/restore application 222 and/or the training server components 224-238 may reside in any combination of partially on the first server 210, partially on another server which is not depicted in FIG. 2, and partially on the clients 202-208.

The second server 212 may be referred to as a production server 212, and may include a production CPU cache 240, a production RAM 242, a production solid-state drive 244, production hard disk drives 246, a production virtual machine 248, a production cache eviction algorithm 250, a production pipeline 252, and a production machine-learning data classifier model 254. In some embodiments, the training server 210 and the production server 212 may be combined, and/or any combination of the training server components 224-238 may be combined with the production server components 240-254. For example, the production server 212 and the production server components 240-254 may initially function as the training server 210 and the training server components 224-238 until the training of the training machine-learning data classifier model 238 is completed, and then function as the production server 212 and the production server components 240-254.

Although the following paragraphs describe Dell Corporation's PowerProtect® backup/restore application, Dell Corporation's NetWorker® backup/restore application, and Dell Corporation's Avamar® backup/restore application as examples of the backup/restore application 222, the backup/restore application 222 may be any other type of backup/restore application which provides the backup/restore functionalities described in the Background section. The backup server 210 may be any other type of backup server which provides the backup/restore functionalities described in the Background section.

The backup/restore application 222 may be a Dell Corporation's PowerProtect® Data Manager backup/restore application, which supports Microsoft SQL/Exchange/DB2/Oracle/SAP Oracle/SAP HANA/Filesystem/Hadoop and ProtectPoint solutions, as well as Kubernetes containers and virtual environments. Providing more than just access to backups and restore capabilities, PowerProtect® Data Manager provides analytics and reuse for development/testing, leverages the cloud to extend data center capabilities, and protects cloud native applications. PowerProtect® Data Manager's automated orchestration of fail-over, failback, and testing simplifies production disaster recovery scenarios. PowerProtect® Data Manager empowers data and application owners to perform self-service backup and restore operations from native applications directly to Dell protection storage appliances. When superior performance is crucial, PowerProtect® Data Manager provides a direct path between Dell tier 1 storage and PowerProtect® Data Domain and/or Data Domain. PowerProtect® Data Manager extends protection to the cloud by tiering backups to cloud storage for long-term retention, thereby maximizing retention and access to backups without impacting on-premises protection storage resources. When tiering is not enough, PowerProtect® Data Manager enables disaster recovery to the public cloud. At the same time, PowerProtect® Data Manager's governance control provides IT with the necessary oversight and governance to ensure compliance, making even the strictest service level objectives obtainable.

The backup/restore application 222 may be an Dell Corporation's NetWorker® backup/restore application, which is a suite of enterprise level data protection software that unifies and automates backup to tape, disk-based, and flash-based storage media across physical and virtual environments for granular and disaster recovery. Cross-platform support is provided for many environments, including Microsoft® Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environments. Add-on database and application modules provide backup services for products such as Microsoft® Exchange Server. Client backup data may be sent to a remote NetWorker® storage node or stored on a locally attached device by the use of a dedicated storage node. Dell Corporation's NetWorker® modules for Microsoft® applications supports Microsoft® products such as Microsoft® Exchange, Microsoft® Sharepoint, Microsoft® SQL Server, and Microsoft® Hyper-V servers.

The backup/restore application 222 may be Dell Corporation's Avamar® backup/restore application, which provides fast, efficient backup and recovery through a complete software and hardware solution. Equipped with integrated variable-length deduplication technology, Dell Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for an immediate single step restore. The transmission of deduplicated backup sends only changed blocks, reducing network traffic. Dell Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. Dell Corporation's Avamar® data store features redundant power and networking, redundant array of independent disks, and redundant array of inexpensive nodes technology to provide uninterrupted data accessibility. Periodic checks of data systems ensure recoverability whenever needed. Dell Corporation's Avamar® systems may be deployed in an integrated solution with Dell Corporation's Data Domain® systems for high-speed backup and recovery of specific data types. The storage array 112 may be a Dell Corporation's Powermax, a Dell Corporation XIO, or a Dell Corporation Unity storage array.

Figure 2B:
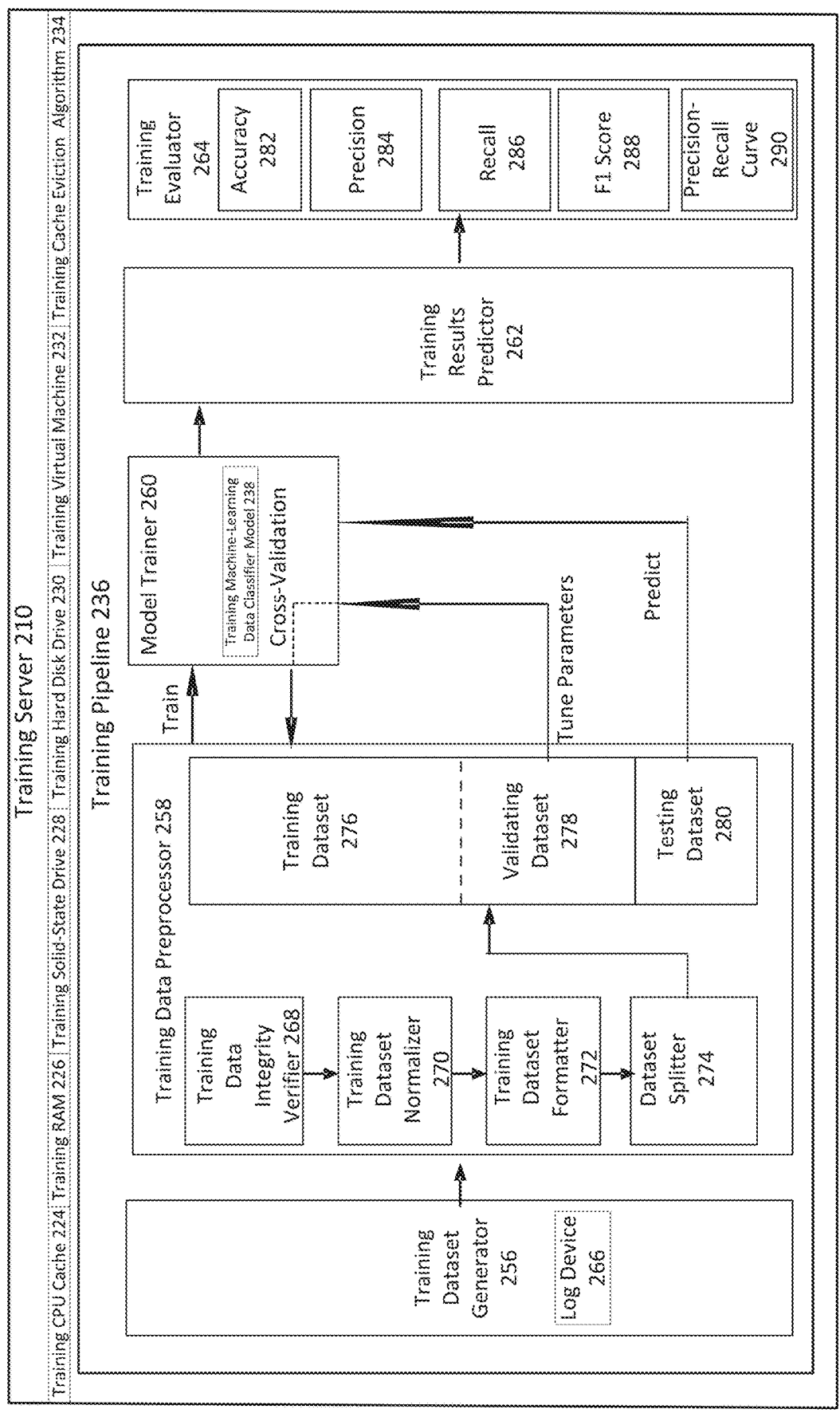
FIG. 2B illustrates a block diagram of an example training pipeline in a training server for intelligent cache warm-up on data protection systems, under an embodiment.

FIG. 2B illustrates an example of the training pipeline 236 in the training server 210 for training the training machine-learning data classifier model 238. Although FIG. 2B depicts the training pipeline 236 as including five components, a training dataset generator 256, a training data preprocessor 258, a model trainer 260, a training results predictor 262, and a training evaluator 264, the training pipeline 236 may include any number of components by combining and/or dividing any of the components 256-264. The training dataset generator 256 can use a log device 266 to create training data, which may be binary data organized into data blocks of a certain size, such as 8 kb (kilobytes). The log device 266 can collect samples of frequently accessed data blocks and infrequently accessed data blocks in an image of an executing workload that may be stored in any of the lower levels of storage devices, such as the training virtual machine 232 initially stored in the training hard disk drives 230 and then moved to the training solid state drive 228. The log device 266 can prepare to annotate data blocks with labels by recording the addresses of data blocks which are frequently requested and moved to the higher levels of storage devices, such as the training CPU cache 224 and/or the training RAM 236, and annotating these frequently accessed data blocks with a label, such as "+1," which represents "cached" or "hot data." The log device 266 can prepare to annotate data blocks with labels by recording the addresses of infrequently accessed data blocks that are evicted by a cache eviction algorithm from, or were never cached in, the training solid state drive 228, and annotating these infrequently accessed data blocks with a label, such as "1," which represents "un-cached" or "cold data." The log device 266 may not collect a large number of samples of frequently accessed data blocks and infrequently accessed data blocks because of the size limitation of the log device 266.

Consequently, the log device 266 identifies multiple data blocks in a workload stored in a slow access persistent storage, identifies some data blocks copied to a fast access persistent storage, and identifies some copied data blocks that remained in the fast access persistent storage after the speed of accessing the workload satisfied a threshold, such as the desired performance for the speeds of reading and writing to a workload when optimal cache warm-up has been achieved. The training server 210 and/or a system administrator may set or modify the threshold, such as setting a threshold to reflect the optimal or a near-optimal speed of accessing different categories of workloads, or selecting the current speed of accessing the workload to stop the log device 266 from logging subsequent data blocks. The log device 266 annotates some of the remaining data blocks with a cache label and can annotate some of the data blocks in the workload, excluding the remaining data blocks, with an un-cached label. Each of the copied data blocks that did not remain in the fast access persistent storage after the speed of accessing the workload satisfies a threshold may have been evicted by a cache eviction algorithm.

A data block can be a piece of information that is processed as a unit. A workload can be an application or a virtual machine. An application can be a computer program that performs a specific task or set of tasks. A virtual machine can be a software implementation of a computer, which executes programs like a physical computer. A slow access persistent storage can be a long-term computer memory that has sluggish communication, such as a hard disk drive. A fast access persistent storage can be a long-term computer memory that has quick communication, such as a solid-state drive.

A remaining data block can be a piece of information that is processed as a unit and is still present. A cache label can be a classifying phrase that indicates a computer memory with short access time used for storage of frequently or recently used data. An un-cached label can be a classifying phrase that does not indicate a computer memory with short access time used for storage of frequently or recently used data. A speed can be a rate at which something is able to operate. A threshold can be the magnitude or intensity that a speed of access must satisfy for a certain result to occur. A cache eviction algorithm can be a step by step procedure that removes data from a computer memory with short access time used for storage of frequently or recently used data.

Then the training dataset generator 256 derives the features of the data blocks sampled by the log device 266 as sets of features, with the features based on corresponding bits set and/or corresponding time stamps. A bit set can be a binary digit with a value of one. A timestamp can be a digital record of when a particular event occurred. The feature N of a data block is the value of first N bytes in the data block, where N is a tunable parameter which the training machine-learning data classifier model 238 can tune during the training and/or the validation stage. For example, during the training stage the training machine-learning data classifier model 238 learns that using the value of the first 2 bytes in multiple data blocks to differentiate between some of more than one million data blocks in the dataset produces the same values for too many of these data blocks, so the training machine-learning data classifier model 238 increases the parameter N from the initial integer 2 to the final integer 3, which results in using the value of the first 3 bytes to differentiate between data blocks.

Similarly, the feature M of a data block is the value of last M bytes in the data block, where M is a tunable parameter which the training machine-learning data classifier model 238 can tune during the training and/or the validation stage. The feature O of a data block is the number of ones, or set bits, in the data block, and the corresponding feature Z of a data block is the number of zeros, or unset bits, in the data block. The feature H of a data block is a hash value of the data block. The training machine-learning data classifier model 238 may try many different hash functions during the training stage, and then retain the hash value for data blocks which most improves the prediction results.

The feature LT of a data block is the last time stamp when the data block was accessed most recently. The feature CT of a data block is the time stamp when the data block was first created. The feature P of a data block is the priority of the data block. If the data blocks are sampled from multiple workloads that have different priorities, then the sampled data blocks will have these different priorities. If the data blocks are sampled from one workload that has a single priority, such as a virtual machine, then the sampled data blocks will have the same priority. The training dataset generator 256 can assemble all these features for each sample data block to create sets that include the features: <N, M, O, Z, H, LT, CT, P>, which are combined with the addresses and annotated labels of the sample data blocks to form a dataset.

A feature can be a distinctive attribute or aspect of something. A value can be the numerical amount denoted by an algebraic term; a magnitude, quantity, or number. A number can be an arithmetical value representing a particular quantity and used in counting and making calculations. A byte can be a group of binary digits or bits (usually eight) operated on as a unit. A bit not set can be a binary digit with a value of zero.

A hash value can be data of a fixed size to which a function maps data of arbitrary size. A most recent access can be a communication that is closest to the present time. A creation can be the action or process of bringing something into existence. A priority can be a condition of a thing being more urgent than other things.

After generating the dataset, the training dataset generator 256 provides the dataset to the training data preprocessor 258, which uses a training data integrity verifier 268 to verify the integrity of the data in the dataset. Although in theory the dataset could be used directly for training the training machine-learning data classifier model 238, in practice the preprocessing of the dataset significantly increases the effectiveness of the training machine-learning data classifier model 238. Following the verification of the integrity of the set of features for each data block in the dataset, the training data preprocessor 258 can use a training dataset normalizer 270 to normalize each feature. It may be necessary to normalize the features in the dataset because each feature is represented as a value that may have significantly different ranges, which could introduce bias into the training machine-learning data classifier model 238 unless each feature is rescaled.

The two most commonly used approaches to rescaling features in a dataset are the Z-score normalization and the MM-Max normalization. The Z-score normalization is defined as $Z=X-\mu\sigma$, where $\mu$ represents the mean of the feature and $\sigma$ denotes the standard deviation of the feature. The MIN–MAX normalization is defined as: $Y=(X-MIN)/(MAX-MIN)$, where MIN and MAX are the minimum and maximum values of the feature, respectively. The training dataset normalizer 270 can use the MIN-MAX normalization to rescale the features of the dataset. For example, if the minimum value of the first 3 bytes in a dataset's data blocks is 0, and the maximum value of the first 3 bytes in the dataset's data block is 4,096, and the value of the first 3 bytes in a specific data block in the dataset is 2,048, then the training data preprocessor 258 calculates $Y=(X-MIN)/(MAX-MIN)=(2,048-0)/(4,096-0)=2,048/4096=0.5$.

Having normalized the features in the dataset, the training data preprocessor 258 can use a training data formatter 272 to convert the normalized features in the dataset into a format that may be readily accessed by the training machine-learning data classifier model 238, such as the Comma Separated Value (CSV) format, in which each column stores a unique feature. Next the training data preprocessor 258 can use a data splitter 274 to split the formatted dataset into a training dataset 276 and a testing dataset 280, such as with the ratio of 80% training data to 20% testing data. Since the amount of data in the training dataset 276 may be limited, the potential problem of underfitting may be solved by the data splitter 274 using a 10-fold cross validation, which evenly splits the training dataset 276 into 10 partitions, keeps 9 of the 10 partitions for the training dataset 276, and uses the remaining 1 partition for a validating dataset 278. For each experiment, the training data preprocessor 258 selects 9 partitions for the training dataset 276 selects the remaining partition as the validating dataset 278, and then uses the validating dataset 278 only to tune the hyper-parameters, or weights. The training data preprocessor 258 sends the training dataset 276 to the model trainer 260 which trains the training machine-learning data classifier model 238 to predict which data blocks in the testing dataset 280 will remain cached in the training solid-state drive 228 and what data blocks in the testing dataset 280 will not remain cached in the training solid-state drive 228. Therefore, the training data preprocessor 258 divides the cache labels and the features into the training dataset 276 used to train a machine-learning model (the training machine-learning data classifier model 238) the validating dataset 278 used to derive weights for the features, and the testing dataset 280 used to test a prediction of the machine learning model (the training machine-learning data classifier model 238).

A training dataset can be a sample of information that is backed up as a unit, such as the information for a computer or a network of computers, and that is used for teaching, A validating dataset can be a sample of information that is backed up as a unit, such as the information for a computer or a network of computers, and that is used for improving the accuracy of something. A weight can be an importance or effective influence assigned to something. A testing dataset can be a sample of information that is backed up as a unit, such as the information for a computer or a network of computers, and that is used to check the performance of something. A prediction can be a forecast or an estimate.

The training machine-learning data classifier model 238 may be unsupervised, such as when an algorithm assigns the cached label to all data blocks that remained in cache when the log device 266 completed logging data blocks and assigns the un-cached label to all data blocks that did not remain in cache when the log device 266 completed logging data blocks. The training machine-learning data classifier model 238 may be unsupervised, such as when a human reviews the labels that an unsupervised algorithm assigned to data blocks, and modifies some of the labels based on the human's knowledge of the data blocks, such as the knowledge that when the log device 266 completed logging data, a cache eviction algorithm had just evicted a data block that is normally a frequently accessed data block. The training machine-learning data classifier model 238 may use different algorithms, such as Support Vector Machine (SVM), Linear Regression, K Nearest Neighbor, Adaboost, Random Forest, Naïve Bayes, Logic Regression. and Linear Regression.

The training machine-learning data classifier model 238 can learn from variable scenarios in which data protection systems are applied. For example, a data storage system which is used by a bank may be entirely different from a data storage system which is used by an Internet company. A bank's system may focus more on database management such as transactions, while an Internet company's system may focus on end-user data, such as photos and documents. In contrast to typical cache warm up algorithms which do not differentiate between the various needs of a bank and an Internet company, the training machine-learning data classifier model 238 may be trained by datasets from variable domains to accommodate different use cases by classifying data blocks as a limited number of categories.

Each category can represent a specific type of workload, such as types of virtual machines which share similar hot data blocks and similar addresses of hot data blocks. Typically, enterprise customers usually use a virtual machine for a certain purpose, such as for an Oracle database, a Microsoft Exchange email server, or for mySQL. Also, enterprise Linux and Windows virtual machines have limited versions and configuration options. This disclosure does not focus on virtual machines with random configurations/applications. Consequently, when using sample data from a workload image file as an input, the training machine-learning data classifier model 238 can identify the workload as corresponding to a specific category of virtual machines, and use the identified category to predict the data blocks that will remain cached, which will be the frequently accessed data blocks that should be used to warm up the solid-state drive cache. A training or a trained machine-learning model can be an application of artificial intelligence to static data that provides a system with the ability to automatically learn and improve from experience without being explicitly programmed.

After sending the training dataset 276, the training data preprocessor 258 sends the validating dataset 278 to the model trainer 260 which uses the training machine-learning data classifier model 238 to tune the hyper-parameters, which function as the weights for the parameters, thereby improving the accuracy of the predictions made by the training machine-learning data classifier model 238. Since different features are expected to have different degrees of impact on the predictions of the training machine-learning data classifier model 238 during the training process, the training machine-learning data classifier model 238 can learn the amount of weight to associate with each feature. Eventually, the feature set could be represented by the features and their corresponding hyper-parameters or weights as: <$\alpha N, \beta M, \gamma O, \delta Z, \eta H, \lambda LT, \varepsilon CT, \mu P$>, where the weights $\alpha+\beta+\gamma+\delta+\eta+\lambda+\varepsilon+\mu=1$. Comparing the results generated from all experiments, the model trainer 260 selects the hyper-parameters that lead to the best results from the training machine-learning data classifier model 238. For some machine-learning data classifier models, the model trainer 260 relies on the validating dataset 278 to tune the hyper-parameters and does not use the testing dataset 280 to tune the hyperparameters.

Following the sending of the training dataset 276 and the validating dataset 278, the training data preprocessor 258 sends the testing dataset 280 to the model trainer 260 which can enable the evaluation of multiple classifier models used by the training machine-learning data classifier model 238 to predict which data blocks in the testing dataset 280 will remain cached in the training solid-state drive 228, which will be the frequently accessed data blocks, and therefore should be used to warm the cache in the training solid-state drive 228. The training machine-learning data classifier model 238 also predicts which data blocks in the testing dataset 280 will not remain cached in the training solid-state drive 228.

The input dataset can make a significant impact on the performance of the classifier models, with different datasets often leading to different prediction results, even when running under the same classifier model. Therefore, the training evaluator 264 can test different formulations, compare the pros and cons among these formulations, and find a balance between the effectiveness and efficiency of each formulation, by using accuracy, precision, recall, and $F_1$-score to evaluate the effectiveness, and by paying attention to the running efficiency. Using the testing data once for each approach, the evaluator 264 can select one of the tested classifier models that is evaluated as performing the best. The table below depicts a confusion matrix.

Confusion Matrix Predict Positive Predict Negative
Actual is Positive True Positive False Negative
Actual is Negative False Positive True Negative The precision of a classifier model is defined as: true positive/(true positive+false positive). The recall of a classifier model is defined as: true positive/(true positive+false negative). The $F_1$-score of a classifier model is defined as: (2*precision*recall)/(precision+recall). Since the $F_1$-score comprehensively uses both the precision and recall, the training evaluator 264 can use this metric to comprehensively evaluate the effectiveness of each classifier model. For example, the training evaluator 264 uses the $F_1$-score of classifier models based on Support Vector Machine, Linear Regression, K Nearest Neighbor, Adaboost, Random Forest, Naïve Bayes, Logic Regression. and Linear Regression, and then selects the classifier model based on Support Vector Machine as the classifier model that performs the best for virtual machines used by Internet companies. A Support Vector Machine is a supervised machine-learning algorithm used to solve classification problems. This approach categories data by finding a separating hyperplane that maximizes the margin between two types of data. In other words, provided the annotated data, the training server 210 is able to generate a classifier model having the capacity to output an optimal hyperplane which could be used to classify data. In 2-dimensional space, the hyperplane could be a line splitting a plane into two parts, with each class residing in one of the parts. FIG. 3A illustrates how the training server 210 applies a Support Vector Machine to categorize the cached data and un-cached data by linearly splitting these types of data by a hyperplane. This is an ideal case which could be solved by a linear Support Vector Machine. Data distribution, however, is often non-linear. FIGS. 3B-D illustrate how even in this case, the training server 210 still can use a Support Vector Machine plus a Kernel data transformation to classify non-linear data by mapping the data from a non-linear space depicted in FIG. 3B to a linear space depicted in FIG. 3C, and then mapped to a non-linear space depicted in FIG. 3D.

Figure 2C:
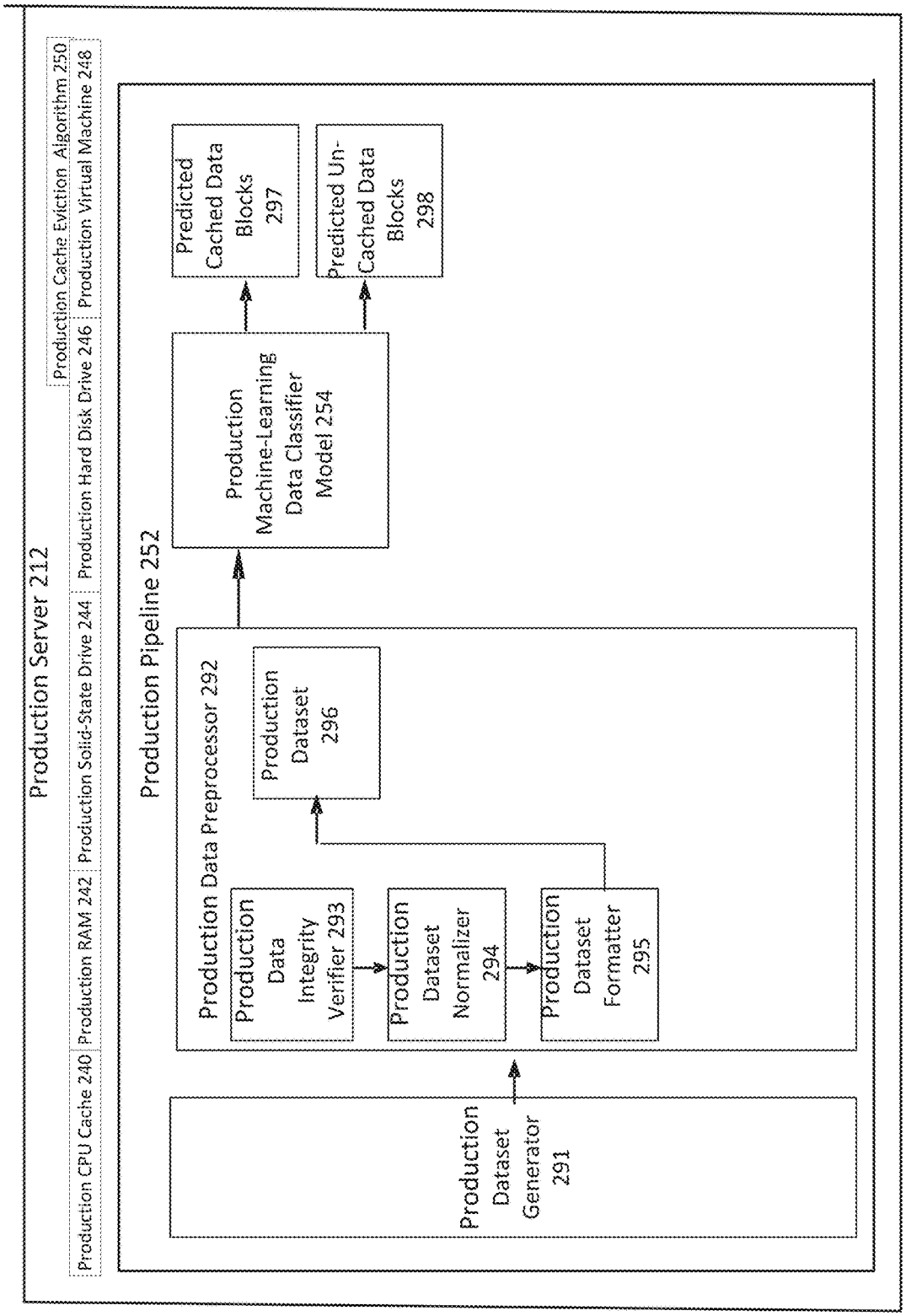
FIG. 2C illustrates a block diagram of an example production pipeline in a production server for intelligent cache warm-up on data protection systems, under an embodiment.

FIG. 2C illustrates an example of the production pipeline 252 in the production server 212. Although FIG. 2c depicts the production pipeline 252 as including five components, a production dataset generator 291, a production data preprocessor 292, the production machine-learning data classifier model 254, predicted cached data blocks 297, and predicted un-cached data blocks 298, the production pipeline 252 may include any number of components by combining and/or dividing any of the components 254, 291, 292, 297, and 298. The production dataset generator 291 generates the features of the raw data within various types of workloads, such as the production virtual machine 248. The feature N of a data block is the value of first N bytes in the data block. Similarly, the feature M of a data block is the value of last Mbytes in the data block.

The feature O of a data block is the number of ones, or set bits, in the data block, and the corresponding feature Z of a data block is the number of zeros, or unset bits, in the data block. The feature Hof a data block is a hash value of the data block. The feature LT of a data block is the last time stamp when the data block was accessed most recently. The feature CT of a data block is the time stamp when the data block was first created. The feature P of a data block is the priority of the data block. The production dataset generator 291 can assemble all these features for a data block requested from a workload to create a set that includes the features: <N, M, O, Z, H, LT, CT, P>, which form a production dataset for any requested data block.

After generating the production dataset, the production dataset generator 291 provides the production dataset to the production data preprocessor 292, which uses a production data integrity verifier 293 to verify the integrity of the data in the production dataset. In theory the production dataset could be used directly by the production machine-learning data classifier model 254 to predict whether a data block will remain cached in the production solid-state drive 244 or will not remain cached in the production solid-state drive 244. However, in practice the preprocessing of the production dataset significantly increases the effectiveness of the production machine-learning data classifier model 254. Following the verification of the integrity of the set of features for a requested data block in the production dataset, the production data preprocessor 292 can use a production dataset normalizer 294 to normalize each feature.

It may be necessary to normalize the features in the production dataset because each feature is represented as a value that may have significantly different ranges, which could introduce bias into the production machine-learning data classifier model 254 unless each feature is rescaled. The production dataset normalizer 294 can use the MIN-MAX normalization to rescale the features of the production dataset. Since the production server 212 may not be able to determine what the MIN or MAX value is in the input raw data, the production dataset normalizer 294 can select the MIN and MAX values from the training dataset as the MIN and the MAX for the raw data normalization. For example, if the requested data block is in a virtual machine that has a priority of 2, the production server normalizes the priority for the requested data block by using the MINIMUM sampled value of 0 recorded for virtual machine priorities during training and the MAXIMUM sampled value of 3 recorded for virtual machine priorities during training to normalize the priority of 2 for the requested data block.

Having normalized the features in the production dataset, the production data preprocessor 292 can use a production data formatter 295 to convert the normalized features in the production dataset into a format that may be readily accessed by the production machine-learning data classifier model 254, such as the Comma Separated Value (CSV) format, in which each column stores a unique feature. After preprocessing the production dataset 296, the production data preprocessor 292 sends the preprocessed production dataset 296 to the production machine-learning data classifier model 254 to predict whether any requested data blocks will remain cached in the production solid-state drive 244 or will not remain cached in the production solid-state drive 244. The production machine-learning data classifier model 254 may use different algorithms, such as Support Vector Machine (SVM), Linear Regression, K Nearest Neighbor, Adaboost, Random Forest, Naïve Bayes, Logic Regression. and Linear Regr Each time before loading any data blocks from the production hard disk drive 246 to the production solid-state drive 244, the production server 212 will sample workload data from the production hard disk drive 246 and the production machine-learning data classifier model 254 predicts whether any data block will or will not remain cached in the production solid-state drive 244. During cache warm-up, the production server 212 loads the data blocks that are predicted to remain cached, and therefore will be frequently accessed data blocks, at a higher priority into the production solid-state drive 244 instead of simply prefetching some data blocks that are nearby the data requested from the production hard disk drive 246. The production machine-learning data classifier model 254 does not expect all data from the production hard disk drive 246 to be cached in the production solid-state drive 244.

Figure 2D:
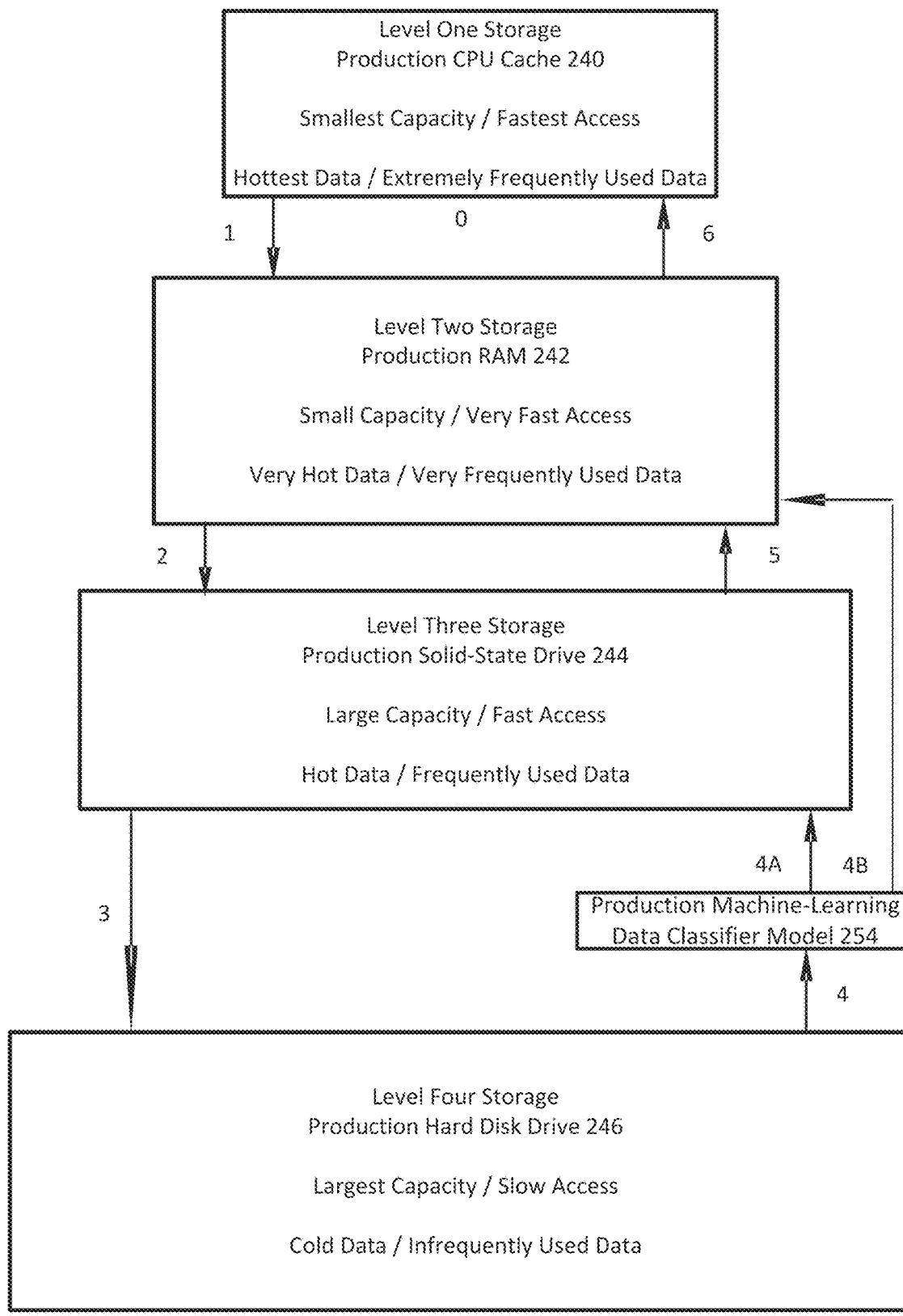
FIG. 2D illustrates a block diagram of an example multi-level cache architecture for intelligent cache warm-up on data protection systems, under an embodiment.

FIG. 2D illustrates a block diagram of an example multi-level cache architecture for intelligent cache warm-up on data protection systems, under an embodiment. In comparison to FIG. 1, there are two new data access paths 4A and 4B in the multi-level cache architecture depicted by FIG. 2 D. Data access pattern 1→2→3→4 occurs when the requested data is in the production hard disk drive 246, and the production server 212 determines that the production CPU cache 240 does not store the requested data, uses the data request 1 to determine that the production RAM 242 does not store the requested data, uses the data request 2 to determine that the production solid-state drive 244 does not store the requested data, and uses the data request 3 to request the data from the production hard disk drive 246. Then the production server 212 uses the data response 4 to return the data from the production hard disk drive 246 to the production machine-learning data classifier model 254 instead of to the solid-state drive 244.

If the production machine-learning data classifier model 254 predicts that the data will remain cached, and therefore be frequently accessed data that should be cached in the production solid-state drive 244, the production server 212 will use the data response 4A to return the data from the production machine-learning data classifier model 254 directly to the production solid-state drive 244 for caching. After data response 4A, the production server 212 uses the data response 5 to return the data from the production solid-state drive 244 to the production RAM 242, and uses the data response 6 to return the data from the production RAM 242 to the production CPU cache 240.

If the production machine-learning data classifier model 254 predicts that the data will not remain cached, and therefore will be infrequently accessed data that should not be cached in the production solid-state drive 244, the production server 212 will use the data response 4B to return the data from the production machine-learning data classifier model 254 directly to the production RAM 242, bypassing the production solid-state drive 244. After data response 4B, the production server 212 uses the data response 6 to return the data from the production RAM 242 to the production CPU cache 240.

The cache warmup of the production solid-state drive 244 is improved by predicting which section of a workload, such as an application or a virtual machine, will be frequently accessed, such that cache warmup will become smart and fast, which will help workloads achieve desired performance in less time. The production server 212 will enable an increase in the number of workloads, such as applications and virtual machines that may be cached into the same capacity of the production solid-state drive 244. Since the production server 212 moves only the predicted working set of an application or a virtual machine to the production solid-state drive 244, the unnecessary solid-state drive churn is reduced, which increase the lifetime of the production solid-state drive 244. This reduction in cache churn enables the design of data protection products which use low Writes Per Day (WPD) solid-state drives and thus reduces the overall cost of the data protection products. Compared with legacy data caching mechanisms, the production machine-learning data classifier model 254 can make better decisions on data caching.

Figure 4:
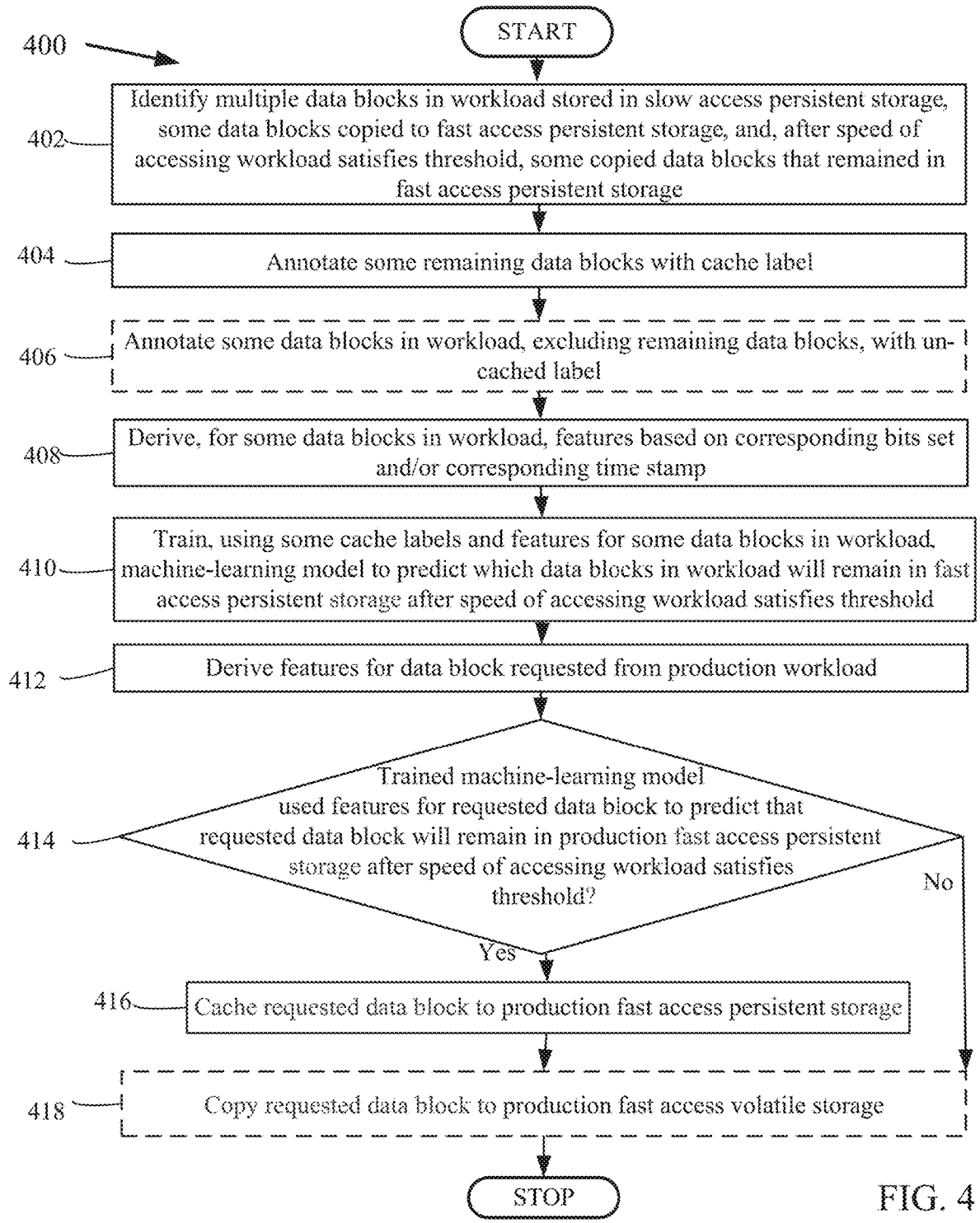
FIG. 4 is a flowchart that illustrates a method of for intelligent cache warm-up on data protection systems, under an embodiment.

FIG. 4 is a flowchart that illustrates a method for intelligent cache warm-up on data protection systems, under an embodiment. Flowchart 400 illustrates method acts illustrated as flowchart blocks for certain steps involved between the clients 202-208 and the servers 210-212 of FIG. 2.

Identifications are made of multiple data blocks in a workload stored in a slow access persistent storage, some data blocks copied to a fast access persistent storage, and, after a speed of accessing the workload satisfies a threshold, some copied data blocks that remained in the fast access persistent storage, block 402. The system samples many data blocks in a workload, some data blocks that are cached, some data blocks that are evicted from cache, and some data bocks that remain cached. For example, and without limitation, this can include the log device 266 logging the addresses of multiple data blocks from some of more than a million 8 kb data blocks in the 100 gb training virtual machine 232, stored in the training hard drive 230, the addresses of some data blocks that were cached in the training solid-state drive 228, the addresses of some data blocks that the training cache eviction algorithm 234 evicted from the training solid-state drive 228, and the addresses of some data blocks that remain cached in the training solid-state drive 228 when cache warm-up is achieved.

After identifying where some data blocks are now located, some of the remaining data blocks are annotated with a cache label, block 404. The system labels some cached data blocks as cached. By way of example and without limitation, this can include the log device 266 annotating some of the data blocks that remain cached in the training solid-state drive 228 with the value "+1," which represents cached.

Following the identification of where some data blocks are now located, some data blocks in the workload, excluding the remaining data blocks, are optionally annotated with an un-cached label, block 406. The system can label some un-cached data blocks as un-cached. In embodiments, this can include the log device 266 annotating some data blocks that were evicted from being cached in the training solid-state drive 228, or never cached in the training solid-state drive 228, with the value "−1," which represents un-cached.

Having labeled some data blocks, features are derived for some data blocks in the workload based on corresponding bits set and/or a corresponding time stamp, block 408. The system derives distinctive features for some data blocks which will enable a training machine-learning model to differentiate between data blocks. For example, and without limitation, this can include the training dataset generator 256 initially selecting the first 2 bytes from some data blocks, learning that too many data blocks have the same values for the first 2 bytes, and then selecting the first 3 bytes from some data blocks.

After assembling the labels and features for some data block, the cache labels and features for some data blocks in a workload are used to train a machine-learning model to predict which data blocks in the workload will remain in a fast access persistent storage after the speed of accessing the workload satisfies a threshold, block 410. The system trains a machine-learning model to predict which data blocks will be cached and remain cached. By way of example and without limitation, this can include the training machine-learning data classifier model 238 using the cache labels and the features for some data blocks in the 100 gb training virtual machine 232 to predict which data blocks will remain cached, and therefore will be frequently accessed data blocks that should be cached on the training solid-state drive 228.

Following the training of a machine-learning model, features are derived for a data block requested from a production workload, block 412. The system responds to a request for a data block in a workload stored in a production server by deriving features to differentiate between data blocks. In embodiments, this can include the production server 212 receiving a request to retrieve a data block from the 100 gb production virtual machine 232 stored in the production hard disk drive 230 by deriving features to differentiate between the requested data block and some of the more than one million other data blocks in the 100 gb production virtual machine 232.

Having derived the features of a requested data block, a trained machine-learning model uses these features for the requested data block to predict whether the requested data block will remain in a production fast access persistent storage after the speed of accessing the production workload satisfies a threshold, block 414. The trained machine-learning model predicts whether the requested data block will remain cached. For example, and without limitation, this can include the production machine-learning data classifier model 254 predicting that the requested data block will remain cached, and therefore will be a frequently accessed data block that should be cached in the production solid-state drive 244.

After predicting whether a requested data block would remain cached, a copy of the requested data block is cached to a production fast access persistent storage, block 416. The system caches the requested data block that is predicted to remain cached. By way of example and without limitation, this can include the production server 212 caching the requested data block, which the production machine-learning data classifier model 254 predicted will remain cached and therefore will be a frequently accessed data block that should be cached, into the production solid-state drive 244.

Following the predicting of whether a requested data block would remain cached, a copy of the requested data block is optionally stored to a production fast access volatile storage, block 418. The system can copy any requested data block to memory. In embodiments, this can include the production server 212 storing the requested data block, which the production machine-learning data classifier model 254 predicted will remain cached, and therefore will be a frequently accessed data block that should be cached, into the production RAM 242. A fast access volatile storage can be a short-term computer memory that has quick communication, such as random-access memory.

Although FIG. 4 depicts the blocks 402-418 occurring in a specific order, the blocks 402-418 may occur in another order. In other implementations, each of the blocks 402-418 may also be executed in combination with other blocks and/or some blocks may be divided into a different set of blocks.

Figure 5:
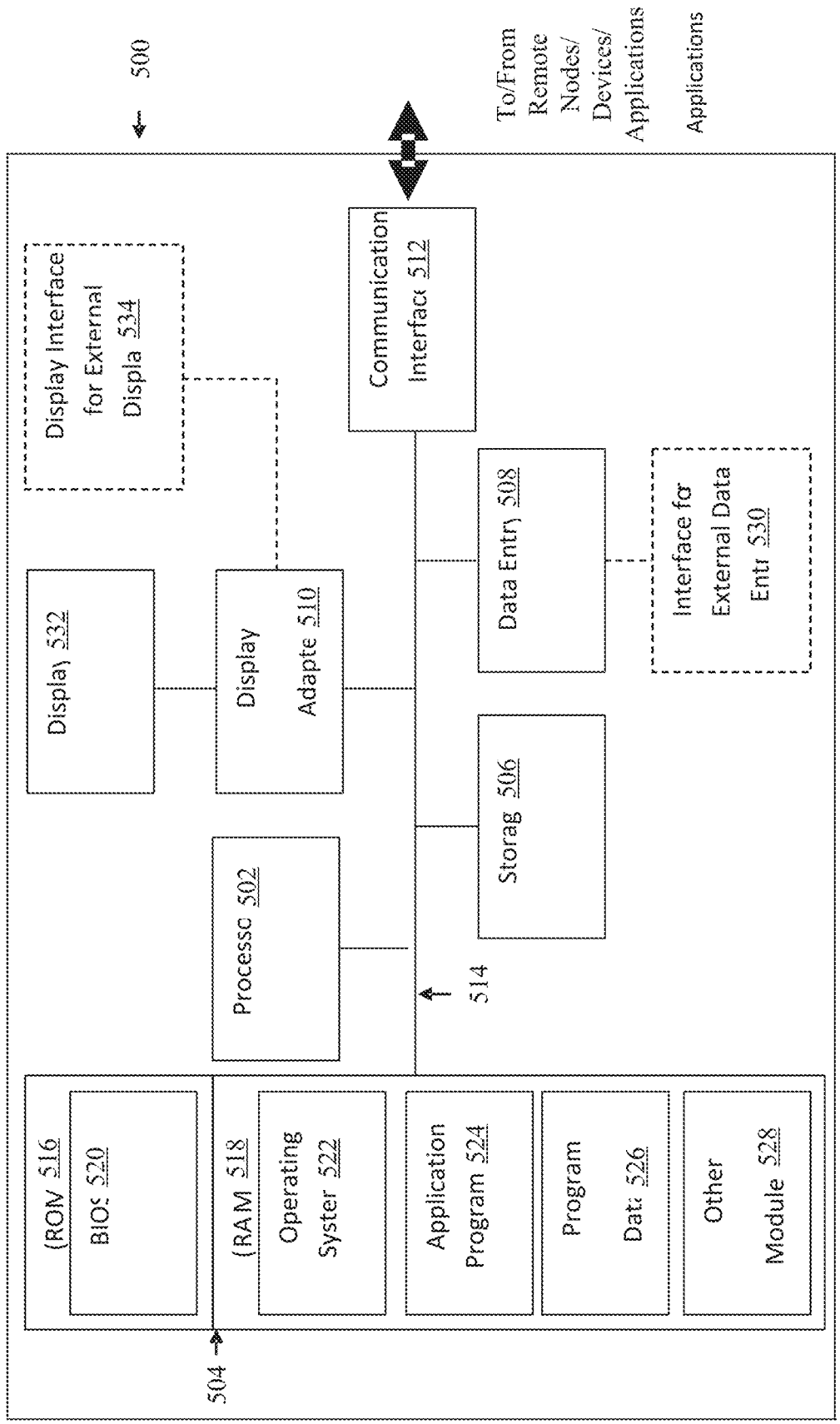
FIG. 5 is a block diagram illustrating an example hardware device in which the subject matter may be implemented.

Having described the subject matter in detail, an exemplary hardware device in which the subject matter may be implemented shall be described. Those of ordinary skill in the art will appreciate that the elements illustrated in FIG. 5 may vary depending on the system implementation. With reference to FIG. 5, an exemplary system for implementing the subject matter disclosed herein includes a hardware device 500, including a processing unit 502, memory 504, storage 506, a data entry module 508, a display adapter 510, a communication interface 512, and a bus 514 that couples the elements 504-512 to the processing unit 502.

The bus 514 may comprise any type of bus architecture. Examples include a memory bus, a peripheral bus, a local bus, etc. The processing unit 502 is an instruction execution machine, apparatus, or device and may comprise a microprocessor, a digital signal processor, a graphics processing unit, an application specific integrated circuit (ASIC), a field programmable gate array (FPGA), etc. The processing unit 502 may be configured to execute program instructions stored in the memory 504 and/or the storage 506 and/or received via the data entry module 508.

The memory 504 may include read only memory (ROM) 516 and random access memory (RAM) 518. The memory 504 may be configured to store program instructions and data during operation of the hardware device 500. In various embodiments, the memory 504 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 504 may also include nonvolatile memory technologies such as nonvolatile flash RAM (NVRAM) or ROM. In some embodiments, it is contemplated that the memory 504 may include a combination of technologies such as the foregoing, as well as other technologies not specifically mentioned. When the subject matter is implemented in a computer system, a basic input/output system (BIOS) 520, containing the basic routines that help to transfer information between elements within the computer system, such as during start-up, is stored in the ROM 516.

The storage 506 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 500.

It is noted that the methods described herein may be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 506, the ROM 516 or the RAM 518, including an operating system 522, one or more applications programs 524, program data 526, and other program modules 528. A user may enter commands and information into the hardware device 500 through the data entry module 508. The data entry module 508 may include mechanisms such as a keyboard, a touch screen, a pointing device, etc. Other external input devices (not shown) are connected to the hardware device 500 via an external data entry interface 530. By way of example and not limitation, external input devices may include a microphone, joystick, game pad, satellite dish, scanner, or the like. In some embodiments, external input devices may include video or audio input devices such as a video camera, a still camera, etc. The data entry module 508 may be configured to receive input from one or more users of the hardware device 500 and to deliver such input to the processing unit 502 and/or the memory 504 via the bus 514.

A display 532 is also connected to the bus 514 via the display adapter 510. The display 532 may be configured to display output of the hardware device 500 to one or more users. In some embodiments, a given device such as a touch screen, for example, may function as both the data entry module 508 and the display 532. External display devices may also be connected to the bus 514 via an external display interface 534. Other peripheral output devices, not shown, such as speakers and printers, may be connected to the hardware device 500.

The hardware device 500 may operate in a networked environment using logical connections to one or more remote nodes (not shown) via the communication interface 512. The remote node may be another computer, a server, a router, a peer device or other common network node, and typically includes many or all of the elements described above relative to the hardware device 500. The communication interface 512 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 512 may include logic configured to support direct memory access (DMA) transfers between the memory 504 and other devices.

In a networked environment, program modules depicted relative to the hardware device 500, or portions thereof, may be stored in a remote storage device, such as, for example, on a server. It will be appreciated that other hardware and/or software to establish a communications link between the hardware device 500 and other devices may be used.

It should be understood that the arrangement of the hardware device 500 illustrated in FIG. 5 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) may be realized, in whole or in part, by at least some of the components illustrated in the arrangement of the hardware device 500.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 5.

Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for intelligent cache warm-up on data protection systems, comprising:
one or more processors; and
a non-transitory computer readable medium storing a plurality of instructions, which when executed, cause the one or more processors to:
identify multiple data blocks in a workload stored in a slow access persistent storage, identify some of the data blocks copied to a fast access persistent storage, and, identify some of the copied data blocks that remained in the fast access persistent storage after a speed of accessing the workload satisfies a threshold, the speed of accessing the workload being a rate of time at which data is able to be read from and written to the workload;
annotate some of the remaining data blocks in the fast access persistent storage after the speed of accessing the workload satisfied the threshold with a cache label;
derive, for some of the data blocks in the workload, features based on at least one of corresponding bits set and a corresponding time stamp;
train, using some cache labels and the features for some of the data blocks in the workload, a machine-learning model to predict which data blocks in the workload will remain in the fast access persistent storage after the speed of accessing the workload satisfies the threshold;
derive the features for a data block requested from a production workload; and
copy the requested data block to a production fast access persistent storage in response to the trained machine-learning model using the features for the requested data block to predict that the requested data block will remain in the production fast access persistent storage after the speed of accessing the production workload satisfies the threshold.

2. The system of claim 1, wherein each of the copied data blocks that did not remain in the fast access persistent storage after the speed of accessing the workload satisfies the threshold were evicted by a cache eviction algorithm.

3. The system of claim 1, wherein the plurality of instructions further causes the processor to annotate some of the data blocks in the workload, excluding the remaining data blocks, with an un-cached label.

4. The system of claim 1, wherein the features for any data block comprise a value of a number of first bytes corresponding to the data block, a value of a number of last bytes corresponding to the data block, a value of a total number of bits set corresponding to the data block, a value of a total number of bits not set corresponding to the data block, a hash value corresponding to the data block, a time stamp associated with a most recent access corresponding to the data block, a time stamp associated with a creation corresponding to the data block, and a priority associated with the corresponding data block, and deriving the features further comprises using maximum and minimum of values of features to normalize the features.

5. The system of claim 1, wherein training the machine learning model further comprises dividing the cache labels and the features into a training dataset used to train the machine-learning model, a validation dataset used to derive weights for the features, and a testing dataset used to test the prediction of the machine learning model, wherein testing the prediction of the machine-learning model comprises evaluating at least one of a precision and a recall associated with the prediction.

6. The system of claim 1, wherein predicting which data blocks in the workload will remain in the fast access persistent storage after the speed of accessing the workload satisfies the threshold also comprises predicting which data blocks in the workload will not be in the fast access persistent storage after the speed of accessing the workload satisfies the threshold.

7. The system of claim 1, wherein the plurality of instructions further causes the processor to copy the requested data block to a production fast access volatile storage.

8. A computer-implemented method for intelligent cache warm-up on data protection systems, the computer-implemented method comprising:
identifying multiple data blocks in a workload stored in a slow access persistent storage, identify some of the data blocks copied to a fast access persistent storage, and, identify some of the copied data blocks that remained in the fast access persistent storage after a speed of accessing the workload satisfies a threshold, the speed of accessing the workload being a rate of time at which data is able to be read from and written to the workload;
annotating some of the remaining data blocks in the fast access persistent storage after the speed of accessing the workload satisfied the threshold with a cache label;
deriving, for some of the data blocks in the workload, features based on at least one of corresponding bits set and a corresponding time stamp;
training, using some cache labels and the features for some of the data blocks in the workload, a machine-learning model to predict which data blocks in the workload will remain in the fast access persistent storage after the speed of accessing the workload satisfies the threshold;
deriving the features for a data block requested from a production workload; and
copying the requested data block to a production fast access persistent storage in response to the trained machine-learning model using the features for the requested data block to predict that the requested data block will remain in the production fast access persistent storage after the speed of accessing the production workload satisfies a threshold.

9. The computer-implemented method of claim 8, wherein each of the copied data blocks that did not remain in the fast access persistent storage after the speed of accessing the workload satisfies the threshold were evicted by a cache eviction algorithm.

10. The computer-implemented method of claim 8, wherein the computer-implemented method further comprises annotating some of the data blocks in the workload, excluding the remaining data blocks, with an un-cached label.

11. The computer-implemented method of claim 8, wherein the features for any data block comprise a value of a number of first bytes corresponding to the data block, a value of a number of last bytes corresponding to the data block, a value of a total number of bits set corresponding to the data block, a value of a total number of bits not set corresponding to the data block, a hash value corresponding to the data block, a time stamp associated with a most recent access corresponding to the data block, a time stamp associated with a creation corresponding to the data block, and a priority associated with the corresponding data block, and deriving the features further comprises using maximum and minimum of values of features to normalize the features.

12. The computer-implemented method of claim 8, wherein training the machine learning model further comprises dividing the cache labels and the features into a training dataset used to train the machine-learning model, a validation dataset used to derive weights for the features, and a testing dataset used to test the prediction of the machine learning model, wherein testing the prediction of the machine-learning model comprises evaluating at least one of a precision and a recall associated with the prediction.

13. The computer-implemented method of claim 8, wherein predicting which data blocks in the workload will remain in the fast access persistent storage after the speed of accessing the workload satisfies the threshold also comprises predicting which data blocks in the workload will not be in the fast access persistent storage after the speed of accessing the workload satisfies the threshold.

14. The computer-implemented method of claim 8, wherein the computer-implemented method further comprises copying the requested data block to a production fast access volatile storage.

15. A computer program product, comprising a non-transitory computer-readable medium having a computer-readable program code embodied therein to be executed by one or more processors, the program code including instructions to:
   identify multiple data blocks in a workload stored in a slow access persistent storage, identify some of the data blocks copied to a fast access persistent storage, and, identify some of the copied data blocks that remained in the fast access persistent storage after a speed of accessing the workload satisfies a threshold, the speed of accessing the workload being a rate of time at which data is able to be read from and written to the workload;
   annotate some of the remaining data blocks in the fast access persistent storage after the speed of accessing the workload satisfied the threshold with a cache label;
   derive, for some of the data blocks in the workload, features based on at least one of corresponding bits set and a corresponding time stamp;
   train, using some cache labels and the features for some of the data blocks in the workload, a machine-learning model to predict which data blocks in the workload will remain in the fast access persistent storage after the speed of accessing the workload satisfies the threshold;
   derive the features for a data block requested from a production workload; and
   copy the requested data block to a production fast access persistent storage in response to the trained machine-learning model using the features for the requested data block to predict that the requested data block will remain in the production fast access persistent storage after the speed of accessing the production workload satisfies the threshold.

16. The computer program product of claim 15, wherein each of the copied data blocks that did not remain in the fast access persistent storage after the speed of accessing the workload satisfies the threshold were evicted by a cache eviction algorithm.

17. The computer program product of claim 15, wherein the program code includes further instructions to:
   annotate some of the data blocks in the workload, excluding the remaining data blocks, with an un-cached label; and
   copy the requested data block to a production fast access volatile storage.

18. The computer program product of claim 15, wherein the features for any data block comprise a value of a number of first bytes corresponding to the data block, a value of a number of last bytes corresponding to the data block, a value of a total number of bits set corresponding to the data block, a value of a total number of bits not set corresponding to the data block, a hash value corresponding to the data block, a time stamp associated with a most recent access corresponding to the data block, a time stamp associated with a creation corresponding to the data block, and a priority associated with the corresponding data block, and deriving the features further comprises using maximum and minimum of values of features to normalize the features.

19. The computer program product of claim 15, wherein training the machine learning model further comprises dividing the cache labels and the features into a training dataset used to train the machine-learning model, a validation dataset used to derive weights for the features, and a testing dataset used to test the prediction of the machine learning model, wherein testing the prediction of the machine-learning model comprises evaluating at least one of a precision and a recall associated with the prediction.

20. The computer program product of claim 15, wherein predicting which data blocks in the workload will remain in the fast access persistent storage after the speed of accessing the workload satisfies the threshold also comprises predicting which data blocks in the workload will not be in the fast access persistent storage after the speed of accessing the workload satisfies the threshold.

\* \* \* \* \*